(12) United States Patent
Vaughan

(10) Patent No.: US 7,100,540 B2
(45) Date of Patent: Sep. 5, 2006

(54) PORTABLE STEAM AND HEAT GENERATOR

(75) Inventor: Steven Vaughan, Victoria (CA)

(73) Assignee: Hot Water Holdings LTD, Victoria (CA)

( * ) Notice: Subject to any disclaimer, the term of this patent is extended or adjusted under 35 U.S.C. 154(b) by 0 days.

(21) Appl. No.: 11/198,354

(22) Filed: Aug. 8, 2005

(65) Prior Publication Data
US 2005/0279293 A1     Dec. 22, 2005

Related U.S. Application Data

(63) Continuation-in-part of application No. PCT/CA04/000156, filed on Feb. 9, 2004.

(30) Foreign Application Priority Data
Feb. 7, 2003   (CA) ................................. 2418548

(51) Int. Cl.
*A01M 19/00*      (2006.01)
(52) U.S. Cl. .................. 122/40; 122/DIG. 10; 47/1.44
(58) Field of Classification Search .................. 122/36, 122/40, DIG. 10; 47/1.44, 1.3, 1.5
See application file for complete search history.

(56) References Cited

U.S. PATENT DOCUMENTS

| | | | |
|---|---|---|---|
| 2,012,521 A * | 8/1935 | Rognerud | 239/154 |
| 3,767,117 A * | 10/1973 | Baker | 239/136 |
| 3,930,616 A * | 1/1976 | Winter | 239/525 |
| 5,372,857 A * | 12/1994 | Browning | 427/446 |
| 5,385,106 A * | 1/1995 | Langshaw | 111/127 |
| 5,430,970 A | 7/1995 | Thompson et al. | |
| 5,927,601 A * | 7/1999 | Newson et al. | 239/1 |
| 5,946,851 A | 9/1999 | Adey et al. | |
| 6,029,589 A | 2/2000 | Simpson | |
| 6,047,900 A | 4/2000 | Newson et al. | |
| 6,321,037 B1 | 11/2001 | Reid et al. | |
| 6,505,437 B1 * | 1/2003 | Johnstone et al. | 47/1.44 |

FOREIGN PATENT DOCUMENTS

| NZ | 237524 | 4/1995 |
|---|---|---|
| WO | WO 00/22926 | 4/2000 |

OTHER PUBLICATIONS

US RE38,857, 11/2005, Brown (withdrawn)*

* cited by examiner

*Primary Examiner*—Gregory Wilson

(57) ABSTRACT

The present invention is directed to an apparatus for directing steam, hot water or hot water vapor and hot air onto a target area, the apparatus comprising a water container and a fuel container connected and supplying water and fuel to an applicator wand with an applicator head which generates steam and heat for application adjacent to the target area of application to the unwanted vegetation. Steam is generated immediately adjacent to the target area within the applicator head and combined with surplus heat from the steam generation process to produce heated steam and water vapor for application to the target area. In a preferred embodiment of the invention, the applicator wand is hand held, the applicator head having an inlet, an outlet and a body therebetween, the water and fuel being supplied to a steam generator and burner within the body of the applicator head which generates steam and hot air adjacent to the target area for application through the outlet to the target area.

15 Claims, 11 Drawing Sheets

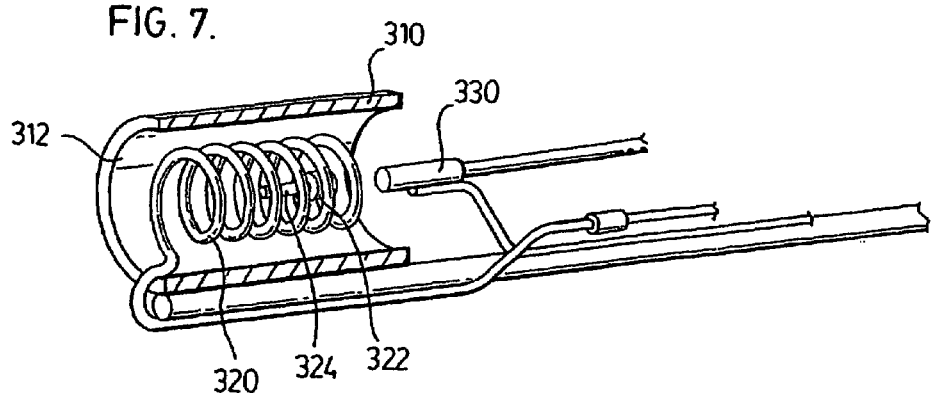
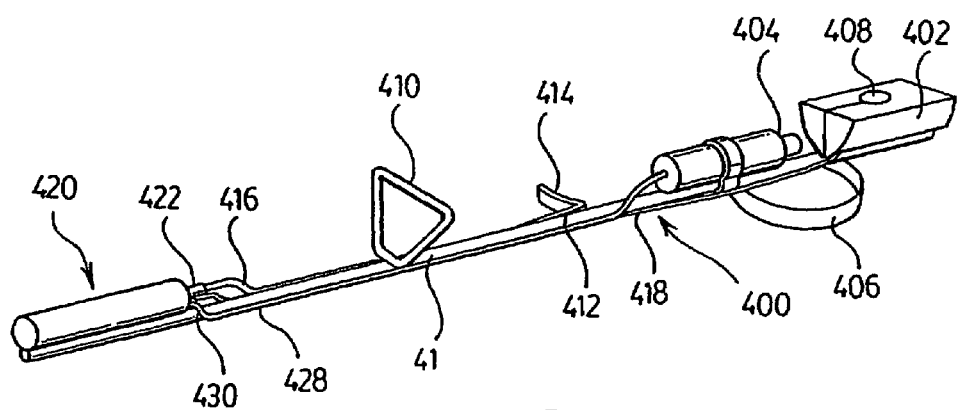

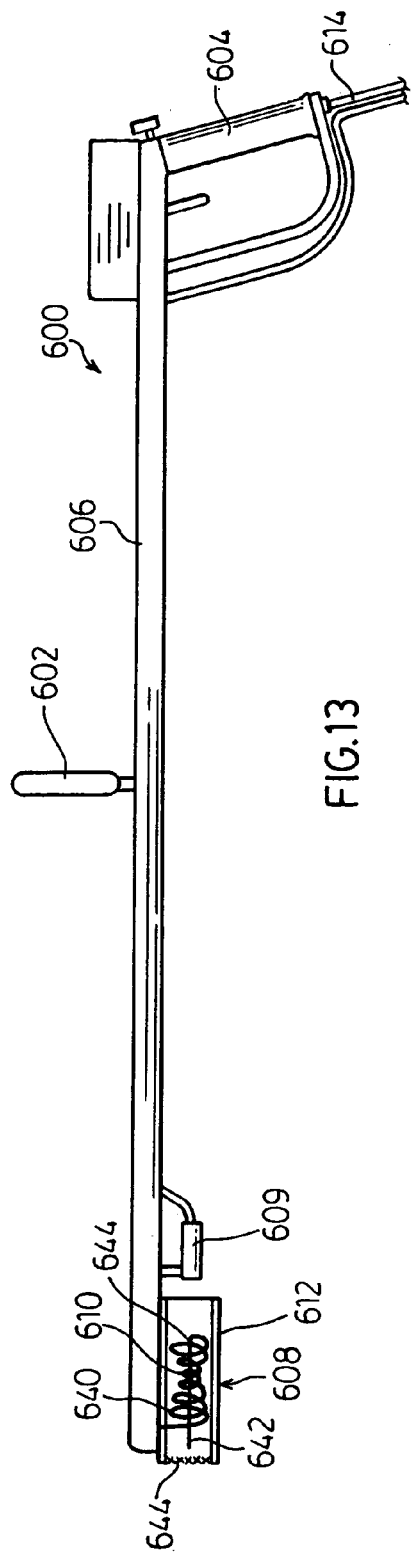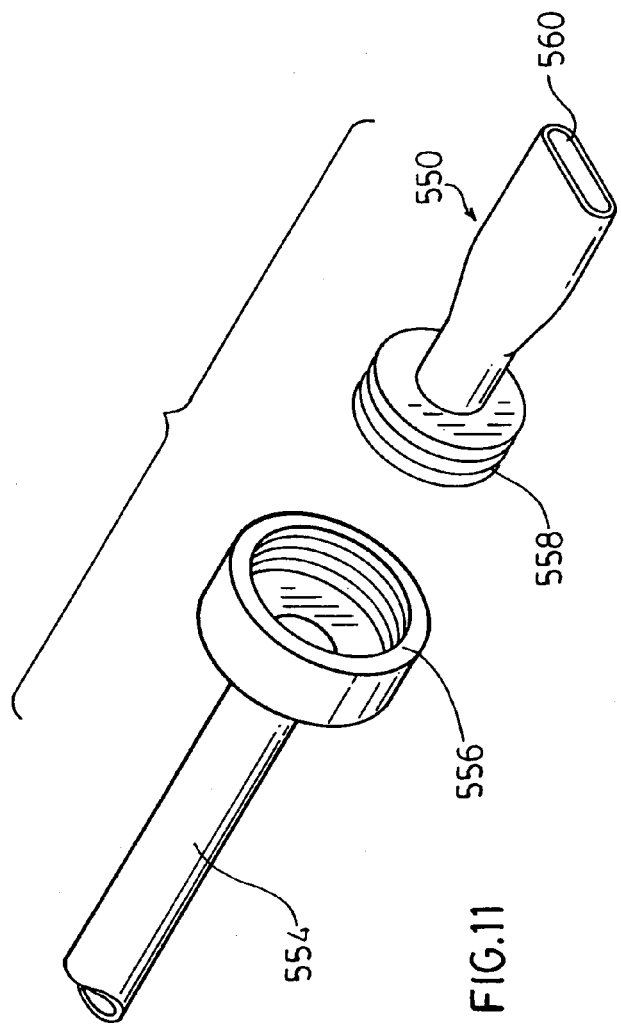
FIG.13
FIG.11

PORTABLE STEAM AND HEAT GENERATOR

CROSS REFERENCE TO RELATED APPLICATIONS

This application is a continuation-in-part of PCT/CA2004/000156 filed Feb. 9, 2004.

FIELD OF THE INVENTION

The present invention is directed to an apparatus for producing a blast of hot air and at least one of steam, hot water or hot water vapor. The apparatus is useful for controlling pests among other uses, particularly vegetation or weeds using the blast of hot air and steam, hot water or hot water vapor. In particular, the present invention is directed to an apparatus where the blast of steam, hot water or hot water vapor and hot air is generated immediately adjacent to a target area to minimize inefficient heat or energy loss through extended delivery systems.

BACKGROUND OF THE INVENTION

The control of unwanted pests, such as vegetative growth, is utilized to improve aesthetic appearance as well as removing the noxious pests or vegetation. In the past, one of the most common methods of controlling such unwanted growth was through the application of pesticides to the vegetation. Such pesticides, particularly herbicides, were commonly applied by spraying a liquid herbicide or through spreading of powders or granules. However, in recent years the use of herbicides has met with increased resistance owing to environmental, health and safety concerns. Herbicides can contaminate soil, air, groundwater and desirable vegetation and may cause health problems to those exposed to such chemicals. In view of these problems, the use of herbicides has been restricted or in some cases completely banned in many jurisdictions.

Another common method of controlling unwanted vegetative growth is through physical removal of the plant. This method has drawbacks in that it is time consuming, labor intensive, physically demanding and disturbs the soil surface, exposing more weed seed. In addition if all of the plant material is not removed and some of the root structure remains, the plant may regrow and have to be removed yet again.

As environmental concerns are reducing the use of pesticides, and the prohibitive costs and inefficiencies of manual weeding become apparent, the use of heat and/or steam for vegetation control is gaining popularity. Heat coagulates plant protein, destroying plant cells, disrupting vascular flow and respiration. Also waxy protective leaf coatings are removed, promoting dehydration and death of the plant. Studies have shown that exposure to 80 C. (176 F) for one second can kill vegetation. Also steam or moist heat is superior to flame or dry heat for weeding as damp air transfers heat more readily, and is easier to apply in a downward direction (hot, dry air rises and diffuses faster). Steam or moist air is less likely to cause accidental fires and thus is safer than flame or dry heat.

Recently, the use of heat to kill unwanted vegetation has been utilized and a number of apparatus to apply heat, generally in the form of hot water or steam have been proposed. Examples of such apparatus are shown in U.S. Pat. Nos. 5,385,106, 5,430,970, 5,927,601, 5,946,851, 6,029,589, 6,047,900, and 6,321,037, PCT Patent Application WO 00/22926 and New Zealand Patent Application 237,524 among others.

U.S. Pat. No. 5,385,106 describes cart, backpack, and vehicle mounted apparatus which utilize propane or electricity to heat water in a chamber which is then delivered along piping for application to the plant. One problem with this apparatus is that the heated water must travel along the tubing before application to the plant which may cause some cooling of the water.

U.S. Pat. No. 5,430,970 describes an apparatus including an endless, ground-engaging belt, or apron, disposed immediately aft of a hot water spray. When hot water is sprayed on the weeds and undergrowth, the sprayed vegetation is not only compressed by the apron, but also heat from the water is retained therein, insulated from ambient conditions by the apron.

U.S. Pat. Nos. 5,927,601 and 6,047,900 describe a vehicle mounted apparatus for the application of pressurized hot water to vegetation particularly along roadside berms. The apparatus has a boiler arranged to heat water supplied under pressure from a water tank and then pass the heated water under pressure to an applicator head. Once again, the heated water must travel along extensive piping which can result in cooling of the water before it reaches the plant.

U.S. Pat. No. 5,946,851 describes a weed killing apparatus having a hollow chamber with an air inlet and an open hot air outlet, a source of compressed air to provide an air flow and a burner assembly for heating the air so that the air exits from the outlet as a blast of hot air and a means for introducing moisture to the heated air so that the plants are wetted and heated to kill them.

U.S. Pat. No. 6,029,589 describes a portable steam weed killing apparatus having an electrically powered steam generator which generates steam and delivers it through flexible tubing to a weed cover placed over the undesired plant. The apparatus, being electrically powered is limited in the area which can be treated which is dependent upon the length of extension cords and is thus not suitable for large scale operation.

U.S. Pat. No. 6,321,037 describes a hand held dispenser of hot water intended for weed control. The apparatus has a handle containing a hose connection for connecting to a domestic water supply, a flow regulator, a heating tube, an exit tube, and a nozzle. The handle is connected to a tube which contains a main electric heating element for heating the water as it flows from the bottom to the top of the apparatus before being piped through the exit tube to the nozzle. Once again, as the apparatus is powered by household electrical supply and connected to the domestic water supply, the range of operation of the apparatus is limited.

PCT Patent Application No. WO 00/22926 describes a large tractor mounted unit which mixes hot gases and steam for application to weeds in agricultural applications. The mixture of hot gases and steam is mixed after the steam generator using pressure and then applied to the desired area. This apparatus is complicated to manufacture and operate.

New Zealand Patent Application No. 237,524 describes a backpack mounted portable steam generator that generates steam within the handle of the applicator and delivers the steam by means of a tube to the target area. This apparatus suffers disadvantages in that the user may be exposed to the hot gases at the handle and the length of the tube may result in cooling of the steam, thereby reducing effectiveness.

There thus remains a need for a simple, lightweight, portable, and cost effective apparatus for applying steam, hot water or hot water vapor and heat to unwanted vegetation to kill the vegetation and which utilizes minimal energy in its operation.

SUMMARY OF THE INVENTION

The present invention is directed to an apparatus for directing at least one of steam, hot water and hot water vapor along with hot air onto vegetation, the apparatus comprising a source of water and a source of fuel connected and supplying water and fuel to a flash boiler located within an applicator head and heated by a burner, the flash boiler and burner generating a blast of at least one of steam, hot water and hot water vapor and hot air within the applicator head adjacent to the target area of application.

In an aspect of the invention, the applicator head further comprises an inlet, an outlet, and a body therebetween, the fuel and water being supplied to the burner and the flash boiler located within the body of the applicator head, the flash boiler and burner generating at least one of steam, hot water and hot water vapor along with hot air adjacent to the outlet for application through the outlet to a target area.

In another aspect of the invention, the applicator wand includes at least one control to control the flow of water and fuel so that the steam is only generated as needed.

In yet another aspect of the invention, the applicator wand includes two controls, a first control for controlling the flow of water and a second control for controlling the flow of fuel.

In a further aspect of the invention, both the first and second controls are controlled by a single switch.

In another aspect of the invention, the first control has an ON position and an OFF position and the second control has a STAND-BY position in addition to an ON and an OFF position, the STAND-BY position permitting sufficient flow of fuel to maintain a pilot flame in the burner.

In yet another aspect of the invention, both controls have an ON position and an OFF position and the burner is provided with an automatic igniter, such as a piezo igniter, activated when the fuel flow valve is turned on.

In yet another aspect of the invention, there is provided an apparatus for producing a blast of at least two of steam, superheated steam, hot air, hot water and hot water vapour for application to a target area, the apparatus comprising a holding means; a flash boiler heated by a burner, the flash boiler and burner coupled to said holding means; and a source of water and a source of fuel connected and supplying water and fuel to the flash boiler and said burner, such that in use, fuel and water are supplied essentially simultaneously to the flash boiler and the burner and a blast is urged therefrom adjacent a target area.

In a further aspect of the invention, the apparatus further includes an applicator head, the applicator head coupled to the holding means, the applicator head comprising a housing, an inlet and an outlet to define a cavity to accept the flash boiler.

In yet another aspect of the invention, the flash boiler is adjacent the outlet.

In yet another aspect of the invention, the apparatus further includes a means to maintain a reduced flow of water to the flash boiler.

In yet another aspect of the invention, the apparatus further includes a means for provided varying flow rates of water to the flash boiler to adjust the ratio of steam, superheated steam, hot water and hot water vapour for application to the target area.

In yet another aspect of the invention, there is provided an apparatus for producing a blast of at least two of steam, superheated steam, hot air, hot water and hot water vapour for application to a target area, the apparatus comprising a holding means; a flash boiler heated by a burner, the flash boiler and burner coupled to said holding means; a fuel container connected and supplying fuel to the burner and a means for connecting the apparatus to a domestic water supply to supply water to the flash boiler, such that in use, fuel and water are supplied essentially simultaneously to the flash boiler and the burner and a blast is urged therefrom adjacent a target area.

In yet another aspect of the invention, there is provided an apparatus for generating at least one of steam, hot water and hot water vapor along with air heated by a burner for application to unwanted vegetation. The apparatus comprises a wheeled cart supporting a water container, a water pump and a fuel container, an applicator wand comprising a holding means and an applicator head coupled to the holding means. The applicator head comprises a housing, an inlet and an outlet to define a cavity to accept a flash boiler adjacent the outlet, the flash boiler comprising a steam generator and a burner for heating the steam generator. A first elongate hose connects the water container to a first control located on the applicator wand, the first control controlling and supplying a flow of water to the steam generator, and a second elongate hose connects the fuel container to a second control located on the applicator wand, the second control controlling and supplying a flow of fuel to the burner. Both the first and second controls are controlled by a single switch, such that when said switch is activated, fuel and water are supplied essentially simultaneously to said flash boiler and a blast of heated air and at least one of steam, superheated steam, hot water and hot water vapor is urged from the outlet to the unwanted vegetation.

BRIEF DESCRIPTION OF THE DRAWINGS

Preferred embodiments of the present invention are illustrated in the attached drawings in which:

FIG. 7 is a perspective view partly in cross section of a fourth embodiment of an apparatus of the present invention;

FIG. 8 is a perspective view partly in cross section of a fifth embodiment of an apparatus of the present invention;

FIG. 11 is a side elevation view of an attachment for treating roots for the apparatus of the present invention;

FIG. 13 is a side elevation view partly in cross section of a further embodiment of an apparatus of the present invention;

DETAILED DESCRIPTION OF THE PREFERRED EMBODIMENTS

The present invention is directed to a method and apparatus for generating a blast of hot air and at least one of steam, hot water or hot water vapor from an applicator head containing a flash boiler heated by a burner, the flash boiler being located in the apparatus adjacent to the outlet to apply the blast to a target area. The apparatus is useful for many applications requiring a blast of hot air and steam, hot water or hot water vapor such as controlling pests through the application of hot air and steam, hot water or hot water vapor directly to the pests only as needed. Other possible uses include a steam cleaner for surfaces not susceptible to heat damage or for heat activation of other materials such as detergents or cleansers or other uses as set out below. Preferably, the apparatus is for controlling pests, particularly unwanted vegetation; however, the apparatus may also be used to control other pests, such as insects, microbial infestations, invertebrates such as mollusks or mussels, etc. The apparatus has an applicator wand for delivery of the heat and steam, hot water or hot water vapor to the vegetation and is characterized by the wand being provided with an applicator head having a burner assembly and steam generator, preferably a flash boiler, located at the end of the wand, adjacent to or in close proximity to the target area of application. The apparatus has a water supply and fuel supply for the burner and steam generator, the water and fuel being supplied to the burner and steam generator through suitable hoses.

Preferably, the apparatus is portable and may be mounted on a backpack, wheeled cart, or vehicle, features the use of an applicator head to generate steam, hot water or hot water vapor and hot air for the primary purpose of vegetation and pest control. Within the applicator head, the combustion of propane or a similar fuel occurs to produce steam, hot water or hot water vapor and surplus hot air, both of which are combined and applied to the target area to control pests, especially unwanted vegetation such as weeds. Water is provided to the applicator wand and preferably pre-heated before being raised to delivery temperature within a flame-heated steam generator, specifically a flash boiler. This creates steam that mixes with the surplus heat from the flame to produce super-heated steam, hot water, and hot air, all of which are driven through the applicator tube on the end of the hand held applicator wand by the pressure of the expanding steam and hot gasses from the flame stream.

Figure 1:
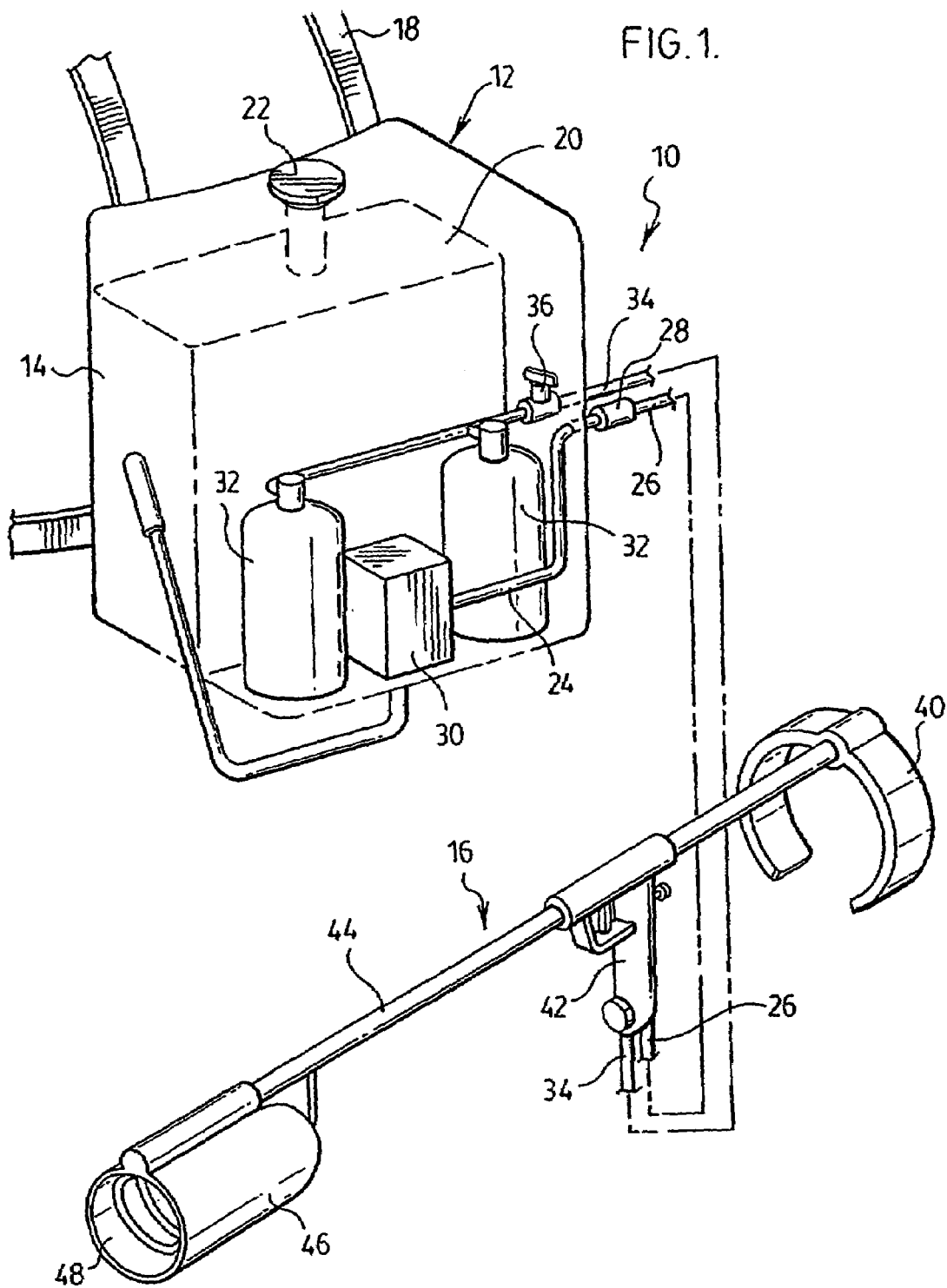
FIG. 1 is a perspective view of a first embodiment of a apparatus for controlling undesired pests according to the present invention for carrying as a backpack.
Figure 2:
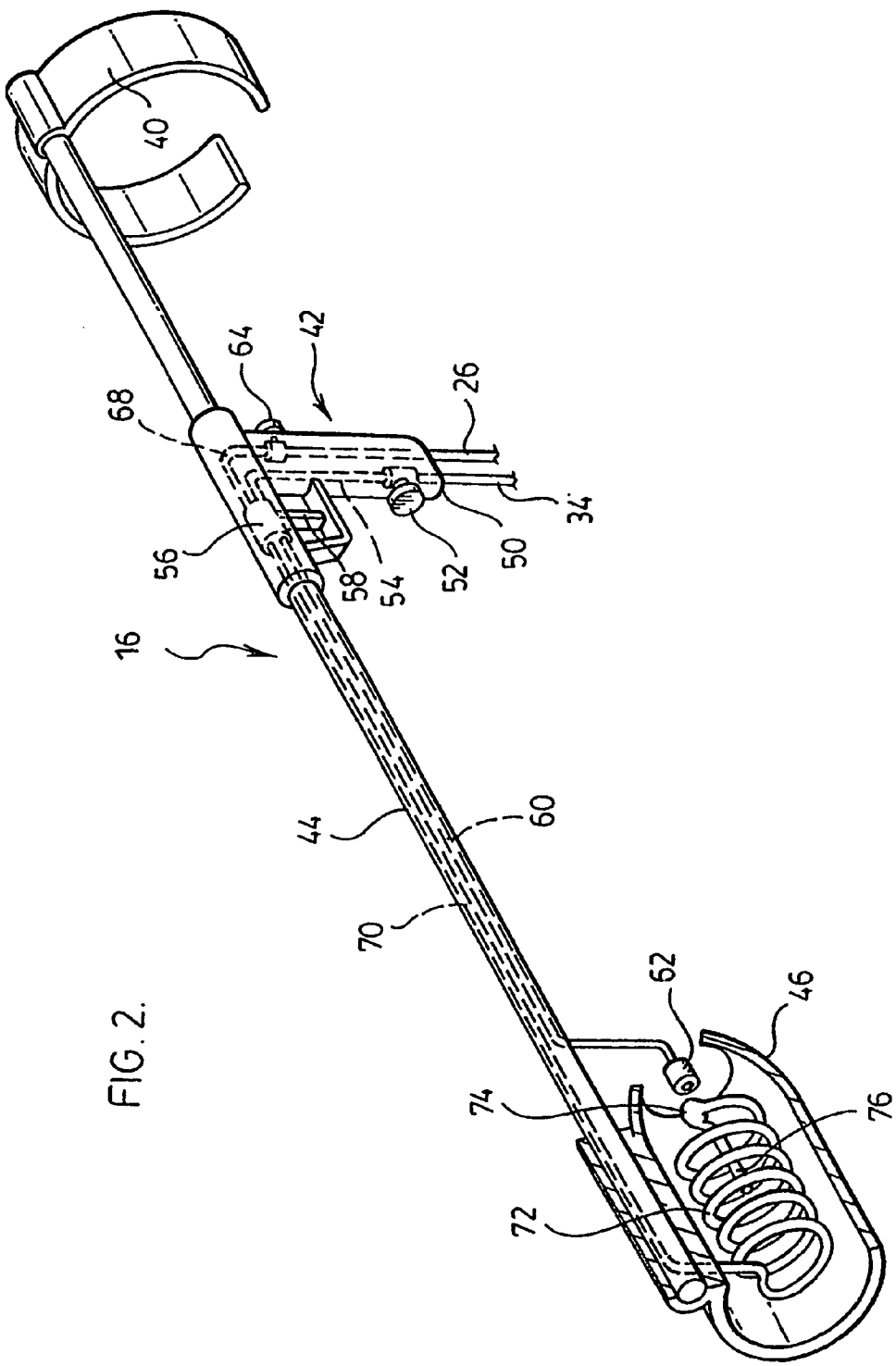
FIG. 2 is a perspective view partly in cross section of the wand of the apparatus of FIG. 1.
Figure 3:
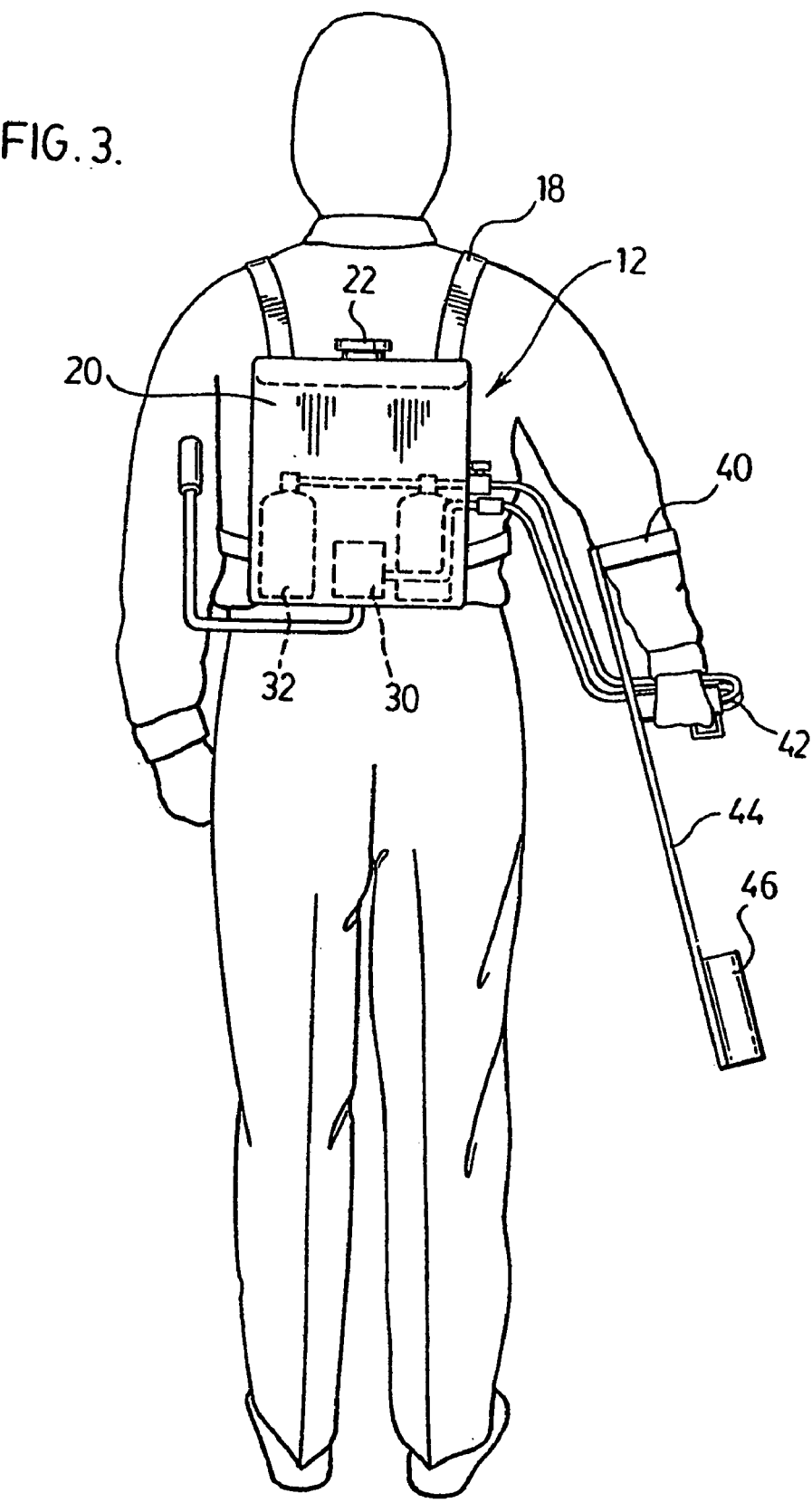
FIG. 3 is a rear view of the apparatus of FIG. 1 being carried by a user.

A first embodiment of the apparatus of the present invention for backpack operation is illustrated in FIGS. 1 to 3 generally indicated by the numeral 10. The apparatus 10 consists of a backpack 12 having a container 14 for holding the water and fuel supply and delivery means for delivering the water and fuel to the applicator wand 16. The backpack 12 is provided with straps 18 by which the container may be carried on a user's back. The interior of the backpack container 14 is provided with a water tank 20, capable of holding sufficient water for operation of the apparatus. As will be explained in further detail below, owing to the design of the apparatus, a few gallons of water is sufficient to allow the operation for the apparatus for at least about 2 hours. The water tank 20 is provided with a filler opening 22 and an outlet 24 connected to the applicator wand 16 through a suitable hose 26. Preferably, the outlet 24 of the water tank 20 is provided with an inline filter 28 for removing any debris or particulate matter which may accumulate in the water tank 20 and which could affect the operation of the downstream valves which will be described below. In order to properly control the flow of water to the steam generator, the water is preferably pumped through the hose by a pump means located in the backpack 12. In the embodiment illustrated, the pump means is a conventional hand pump 30 utilized in back pack mounted liquid spray applicators but the pump means could be electrically powered or use air or gas pressure. An electrically powered pump means would preferably be a demand water pump powered by rechargeable batteries. The pump would only operate if the pressure drops below a preset limit. Thus, the pump only operates as needed. As a further alternative, the pump may be switched on when the trigger is pressed.

In a preferred embodiment, the apparatus is adapted for retrofitting to a pesticide backpack spray apparatus by replacing the spray wand of the backpack sprayer with the apparatus of the present invention and adding a small fuel supply tank or cylinder. The backpack tank is cleaned of pesticide residue and used as the water container and the backpack integral pump is used to generate the water pressure.

The backpack 14 carries a source of fuel for the burner assembly. In the embodiment illustrated, the source of fuel is one or more propane or pressurized gas or liquid fuel cylinders 32. The outlet of the fuel cylinder is attached to a flexible pressurized fuel line 34 which delivers the fuel to the applicator wand 16. As a safety feature, a fuel shut off valve 36 is preferably provided at the outlet of fuel cylinder 32 on the backpack 12.

The applicator wand 16 of this embodiment is designed for one arm operation as illustrated in FIG. 3, and consists of a forearm brace 40, a handle 42 with trigger controls, and a suitable dimensioned metal tube or pipe 44 carrying fuel and water lines and connected to the applicator head 46 containing the burner assembly and steam generator. The applicator head 46 preferably has an insulated, reflective, metallic wall 48 to maximize and focus heat production. The applicator head 46 is dimensioned to produce the desired steam and heat output while being able to be manipulated by the user. Preferably, the applicator head 46 is tubular having a diameter of between about 1 and 4 inches, more preferably about 1 to 3 inches, most preferably about 1.5 inches and a length of between about 4 and 12 inches, more preferably about 6 to 10 inches, most preferably about 8 inches. These dimensions would be adjusted depending upon the size of burner used and the desired output of steam, hot water or hot water vapor and heat.

Referring to FIG. 2, the fuel line 34 is connected to the handle 42 of the applicator wand 16 through a suitable connection such as a quick connect fitting 50. Preferably, for ease of handling, the fuel line 34 and water hose 26 are joined together along most or all of their length. A valve 52 located in the handle downstream from the quick connect fitting 50 regulates the fuel flow to allow for fuel shut off and set the maximum fuel flow. A fuel line 54 travels to the handle from the valve 52 to a control valve 56 controlled by the trigger control 58. The control valve 56 may be a valve having two positions—a "STAND BY" position, which permits a reduced fuel flow to maintain a pilot light in the burner as will be explained below and to provide low heat output, and an ON position when the trigger control is activated which permits full fuel flow and maximum heat. With this type of valve a control is provided to regulate the flow of fuel in the "STAND BY" position to set the pilot light. Alternatively, the control valve may be a simple ON-OFF valve and the apparatus may include an automatic ignition to light the burner when the fuel is turned on. From the control valve 56, a fuel line 60 then travels along the pipe 44 of the applicator wand 16 to the burner head 62 in the applicator head 46.

The water hose 26 is connected to the handle 42 of the applicator wand 16, at which point, the water flow may be set or tuned with a water metering valve 64 used to set the flow rate of the water flowing through the hose 26. Preferably, the water metering valve 64 is an adjustable needle valve, although other types of valves such as a preset orifice valve may also be used to provide the optimal desired flow rate of the water. From the water metering valve 64, a water line 66 is attached to a second valve 68 controlled by the trigger control 58. The second valve 68 may be an on-off valve such that water flow will not commence without the trigger control 56 being activated. The trigger control 56 stops water flow in the "STAND-BY" position, and permits water flow in the "ON" position. Alternatively, the apparatus may provide for a reduced water flow when in the "STAND-BY" mode as will be described in detail below. From the second valve 68, the water travels down a water tube 70 along the applicator wand pipe 44 to a pre-heating assembly 72 within the applicator head 46. In the embodiment illustrated, the pre-heating assembly is a counter current coiled pipe 72 which winds upwards from the bottom of the applicator head adjacent the wall thereof. The water then enters the flash boiler 74, which is located adjacent to and heated by the flame from the burner head 62. Here the water is converted to steam and the pressure of expansion forces it down a short exit pipe 76 to exit out of the applicator tube 46 with additional heat from the flame. This heat and steam is applied to the target area to control the unwanted vegetation.

In continuous use an apparatus as described above will consume approximately 2 to 6 litres (0.75 to 1.6 U.S. Gallons) of water and 450 to 900 grams (1 to 2 lbs) of fuel per hour. Thus, a backpack or apparatus with about 8 litres (2 gallons) water capacity and about 2 kgs (4.5 lbs.) of fuel would weigh approximately 14 kgs. (30 lbs.) when filled, and would permit approximately 2 hours of operation under normal field conditions of selective application or "spot spraying" of vegetation.

Figure 4:
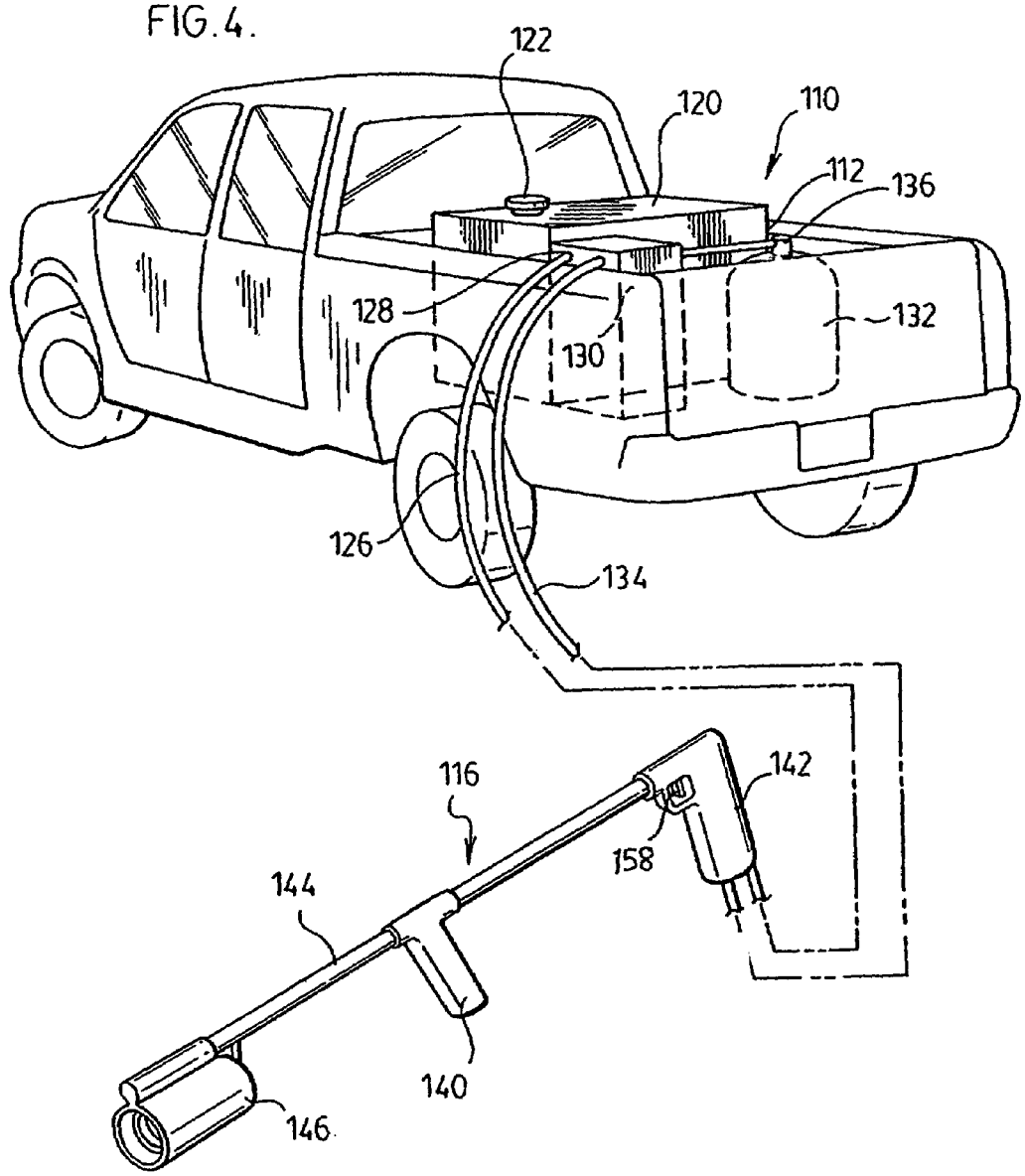
FIG. 4 is a perspective view of a second embodiment of an apparatus for controlling pests according to the present invention for mounting on a truck.

A second embodiment of an apparatus for controlling vegetation according to the present invention is illustrated in FIG. 4. This embodiment of the apparatus is adapted for heavy duty or extended use and is preferably capable of mounting on a vehicle. Depending upon the size of the apparatus, the vehicle may be a wheeled cart that the user may pull or push along as they are removing unwanted vegetation. For larger applications, the apparatus is mounted on a motor vehicle such as the bed of a GATOR™ or truck as is illustrated in FIG. 4.

The apparatus 110 consists of a frame 112 containing a water tank 120 and one or more fuel cylinders 132 as well as fuel supply and delivery means for delivering the water and fuel to the applicator wand 116. The provision of the frame 112 allows the apparatus to be easily moved on and off the bed of the vehicle. The water tank 120 is capable of holding sufficient water for extended operation of the apparatus, generally on the order of 20 to several hundred gallons. The water tank 120 is provided with a filler opening 122 and an outlet 124 connected to the applicator wand 116 through a suitable hose 126. Preferably, the outlet 124 of the water tank 120 is provided with an inline filter 128 for removing any debris or particulate matter which may accumulate in the water tank 120 and which could affect the operation of the downstream valves which will be described below. In order to properly control the flow of water to the steam generator, the water is preferably pumped through the hose by a pump means located in the frame 112. In the embodiment illustrated, the pump means is an electrically powered pump 130 which is powered by an auxiliary battery and/or the vehicles electrical system. Other types of pumps such as a gasoline powered pump may also be used. The pump may be a flow through pump and may operate as a demand pump where the pump is only active when the water pressure in the water line drops below the desired level. Alternatively, the pump could be used to control the air pressure in the tank to force the water through the outlet. As a further alternative, the pump may be switched on when the trigger is pressed.

The apparatus 110 also contains a source of fuel for the burner. In the embodiment illustrated, the source of fuel is one or more propane or pressurized fuel cylinders 132. The outlet of the fuel cylinder 132 is attached to a flexible pressurized fuel line 134 which delivers the fuel to the applicator wand 116. As a safety feature, a fuel shut off valve 136 is preferably provided at the outlet of fuel cylinder 132. In order to provide for control of fuel consumption, the fuel cylinder may be provided with a regulator to regulate the pressure of the fuel being delivered to the apparatus.

The applicator wand 116 of this embodiment is designed for two hand operation and consists of a handle 140, a pistol style grip 142 with trigger controls, and a suitable dimensioned metal tube or pipe 144 carrying the fuel and water lines and connected to the applicator head 146 containing the burner assembly and steam generator. The applicator head 146 preferably has an insulated, reflective, metallic wall 148 to maximize and focus heat production. The applicator head 146 is dimensioned to produce the desired steam and heat output while being able to be manipulated by the user. Preferably, the applicator head 146 is tubular having an inner diameter of between about 2 and 6 inches, more preferably about 2 inches, and a length of between about 8 and 20 inches, more preferably about 14 inches, depending upon burner size and desired steam and hot air output.

Referring to FIG. 4, the fuel line 134 is connected to the pistol grip 142 of the applicator 116 through a suitable connection such as a quick connect fuel fitting 150. Preferably, for ease of handling, the fuel line 134 and water hose 126 are joined together along most or all of their length. A valve 152 located in the pistol grip 142 downstream from the fuel fitting 150 regulates the fuel flow to allow for fuel shut off and set the maximum fuel flow. A fuel line 154 travels through the pipe 144 from the valve 152 to a control valve 156 controlled by the trigger control 158. Preferably, the control valve 156 has two positions—"STAND BY" position, which permits a reduced fuel flow to maintain a pilot light in the burner as will be explained below and to provide low heat output, and an "ON" position when the trigger control is activated which permits full fuel flow and maximum heat. The "STAND BY" position of the valve is adjustable to set the flame for the "STAND BY" or pilot flame such as through the use of a suitable needle valve. From the control valve 156, a fuel line 160 then travels along the pipe 144 of the applicator wand 116 to the burner head 162 in the applicator head 146.

The water hose 126 is connected to the pistol grip 142 of the applicator wand 116, at which point, the water flow is set or tuned with a water metering valve 164 used to set the flow rate of the water flowing through the hose 126. Preferably, the water metering valve 164 is a needle valve, although other types of valves such as a preset orifice valve may also be used to provide the desired flow rate of the water. The water metering valve 164 may be located at other positions along the water path such as just before the applicator head 146. From the flow control valve 164, a water line 166 is attached to a second valve 168 controlled by the trigger control 158. The second valve 168 may be an on-off valve such that water flow will not commence without the trigger control 156 being activated. The trigger control 156 stops water flow in the "STAND-BY" position, and permits water flow in the "ON" position. Alternatively, the apparatus may provide for a reduced water flow when in the "STAND-BY" mode as will be described in detail below. From the second valve 168, the water travels down a water tube 170 along the applicator pipe 144 to a pre-heating assembly 172 within the applicator head 146. In the embodiment illustrated, the pre-heating assembly is a counter current coiled pipe 172 which winds upwards from the bottom of the applicator head 146 adjacent the wall 148 thereof. The water then enters the flash boiler steam chamber 174, which is located adjacent to and heated by the flame from the burner assembly 162. Here the water is converted to steam and the pressure of expansion forces it down a short exit pipe 176 to exit out of the applicator head 146 with additional heat from the flame. This heat and steam is applied to the target area to control the unwanted vegetation.

In the second embodiment, the burner assembly 162 is provided with a plurality of outlets for the fuel such that the flame is applied to the steam generator over a larger area. For example, the burner assembly 162 could be a circular burner head having a plurality of openings to produce a circular flame. Alternatively, the burner assembly 162 could be one or more linear burner heads having a plurality of openings to produce an extended linear flame.

In use an apparatus for mounting in the bed of a truck as described above will use about 6 to 60 liters (1.5 to 15 U.S. gallons) of water per hour and about 900 to 4500 grams (2 to 10 pounds) of propane per hour depending upon the desired output of heat and steam.

Figure 5:
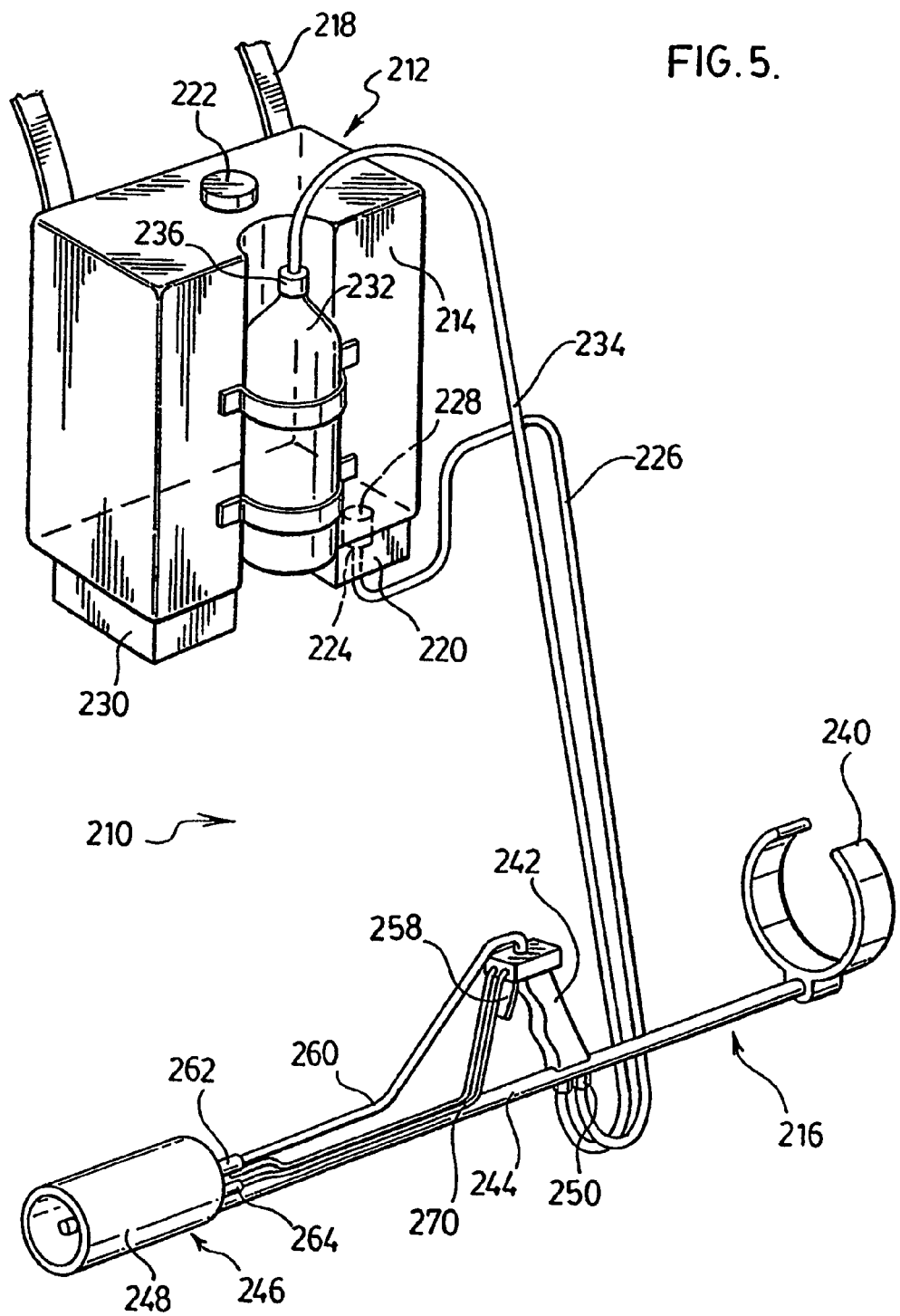
FIG. 5 is a perspective view of a third embodiment of an apparatus of the present invention.
Figure 6:
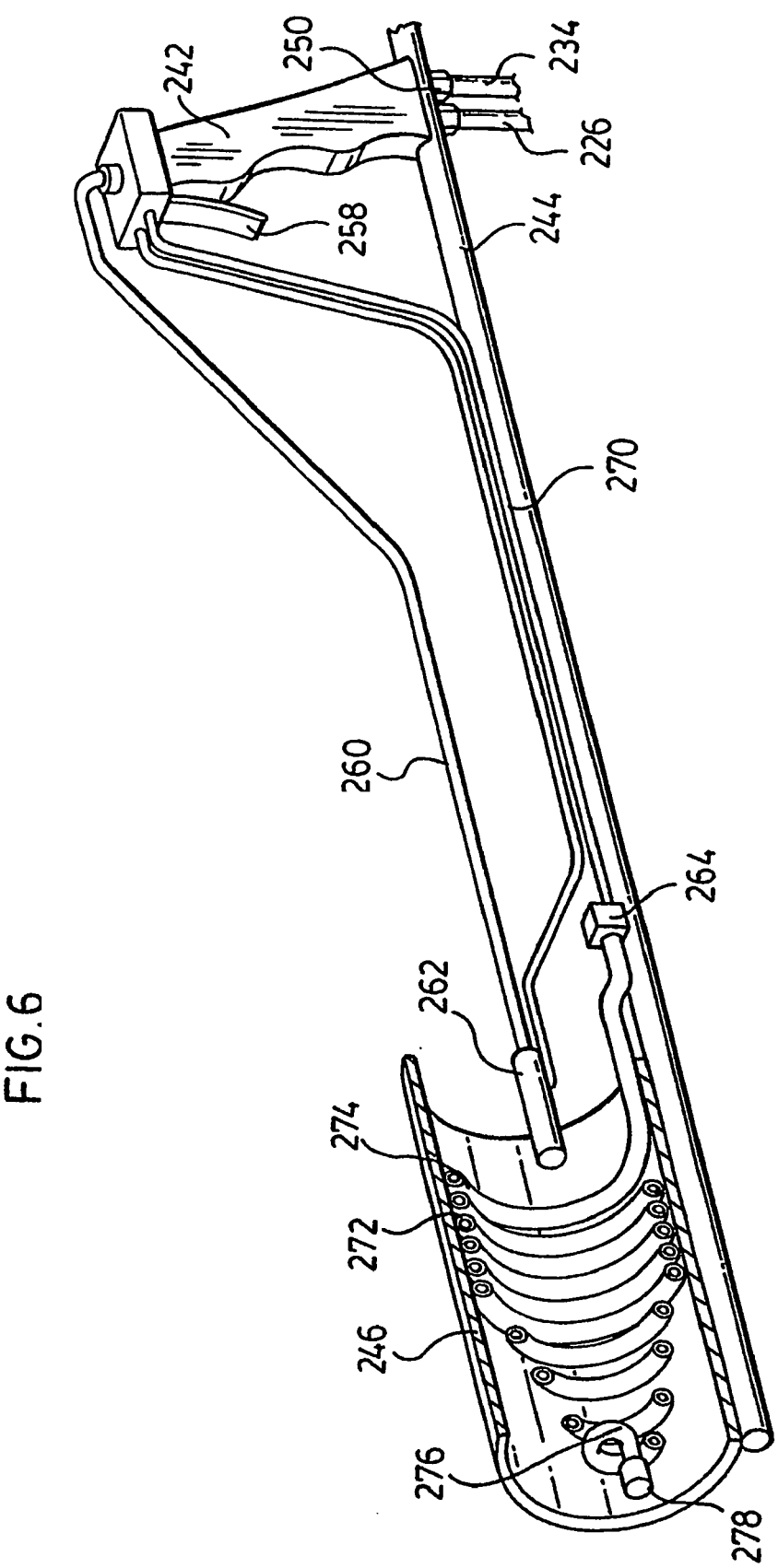
FIG. 6 is a perspective view partly in cross section of the wand of the apparatus of FIG. 5.

A third embodiment of an apparatus according to the present invention is illustrated in FIGS. 5 and 6 generally indicated by the numeral 210. Similar to the first embodiment, this embodiment 210 is adapted for backpack use, however by increasing the sizes of the applicator head and burner and steam generator contained therein, the apparatus may be used for the larger scale applications similar to the second embodiment described above.

The apparatus 210 consists of a backpack 212 having a water container 214 for holding the water supply and carrying the fuel supply and a delivery means for delivering the water and fuel to the applicator wand 216. The backpack 212 is provided with straps 218 by which the backpack 212 may be carried on a user's back. The water container 214 is capable of holding sufficient water for operation of the apparatus. As will be explained in further detail below, owing to the design of the apparatus, a few gallons of water is sufficient to allow the operation for the apparatus for at least about 2 hours. The water container 214 is provided with a filler opening 222 and an outlet 224 connected to the wand 216 through a suitable hose 226. Preferably, the outlet 224 of the water container 214 is provided with an inline filter 228 for removing any debris or particulate matter which may accumulate in the water container 214 and which could affect the operation of the downstream valves which will be described below. In order to properly control the flow of water to the steam generator, the water is preferably pumped through the hose by a pump means located on the backpack 212. In the embodiment illustrated, the pump means is a demand water pump 220 powered by rechargeable batteries 230. The water pump 220 would only operate if the pressure drops below a preset limit. Thus, the water pump 220 only operates as needed. Alternatively, the water pump 220 may be activated by the trigger control 258 described below.

The water container 214 carries a source of fuel for the burner assembly. In the embodiment illustrated, the source of fuel is one or more propane or pressurized gas or liquid fuel cylinders 232. When using propane, the fuel cylinders 232 may be prefilled disposable cylinders or may be refillable cylinders. One such refillable cylinder is a 6 inch diameter by 22 inch long aluminum refillable cylinder capable of holding 6 lb of propane. The use of a regulator to regulate the pressure of the fuel leaving the cylinder may be desired to provide for better control and reduced consumption of fuel usage.

In order to further control the consumption of fuel, it is desired to regulate the temperature of the fuel container 232 during operation of the apparatus. In the embodiment illustrated, the water container has a molded recess into which the fuel cylinder 232 is placed. By providing an extended area of contact between the water container walls and wall of the fuel container 232, the water container 214 acts as a heat sink for the fuel cylinder 232, reducing the tendency of the fuel cylinder 232 to cool down and frost over and thereby maintaining optimum fuel flow even in reduced temperatures or during continuous operation. The outlet of the fuel cylinder 232 is attached to a flexible pressurized fuel line 234 which delivers the fuel to the applicator wand 216. As a safety feature, a fuel shut off valve 236 is preferably provided at the outlet of fuel cylinder 232 on the backpack 212.

The applicator wand 216 of this embodiment is designed for one arm operation as illustrated in FIG. 5, and consists of a forearm brace 240, a handle 242 with trigger controls, and a suitable dimensioned metal tube or pipe 244 carrying fuel and water lines and connected to the applicator head 246 containing the burner assembly and steam generator. The applicator head 246 preferably has an insulated, reflective, metallic wall 248 to maximize and focus heat production. The applicator head 246 is dimensioned to produce the desired steam and heat output while being able to be manipulated by the user. Preferably, the applicator head 246 is tubular having an inner diameter of between about 1 and 4 inches, more preferably about 1 to 3 inches, most preferably about 1.5 to 2 inches and a length of between about 4 and 12 inches, more preferably about 6 to 10 inches, most preferably about 8 inches. These dimensions would be adjusted depending upon the size of burner used and the desired output of steam, hot water or hot water vapor and heat.

Referring to FIG. 6, the fuel line 234 is connected to the handle 242 of the applicator wand 216 through a suitable connection such as a quick connect fitting 250. Preferably for ease of handling the fuel line 234 and water hose 226 may be joined together along most or all of their length. A valve 252 located in the handle downstream from the quick connect fitting 250 controlled by a trigger control 258 regulates the fuel flow to allow for fuel shut off and set the maximum fuel flow. The valve 252 may be a valve having two positions—a "STAND BY" position, which permits a reduced fuel flow to maintain a pilot light in the burner and to provide low heat output, and an ON position when the trigger control is activated which permits full fuel flow and maximum heat. With this type of valve, a control is provided to regulate the flow of fuel in the "STAND BY" position to set the pilot light. Alternatively, the control valve may be a simple ON-OFF valve and the apparatus may include an automatic ignition to light the burner when the trigger is turned depressed. From the handle 242, a fuel line 260 then travels along the pipe 244 of the applicator wand 216 to the burner head 262 at the applicator head 246.

The water hose 226 is connected to the handle 242 of the applicator wand 216, which also contains a second valve 268 controlled by the trigger control 258. The second valve 268 may be an on-off valve such that water flow will not commence without the trigger control 256 being activated. The trigger control 256 stops water flow in the "STAND-BY" position, and permits water flow in the "ON" position. Alternatively, the apparatus may provide for a reduced water flow when in the "STAND-BY" mode as will be described in detail below. From the second valve 268 in the handle 242, the water travels down a water tube 270 along the applicator wand pipe 244 to a water metering valve 264 used to set the flow rate of the water flowing to the steam generator. Preferably, the water metering valve 264 is a preset orifice valve having a opening sized to set the desired flow rate, although other types of valves such as an adjustable needle valve may also be used to provide the desired flow rate of the water. Preferably a filter or mesh is provided immediately before the water metering valve 264 to reduce the likelihood of the water metering valve 264 becoming clogged. The water metering valve 264 is located just before a steam generator 272 within the applicator head 246 and a one way valve may also be provided just before the steam generator 272 to reduce back pressure during operation of the apparatus. In the embodiment illustrated, the steam generator 272 includes a pre heater which is a coiled pipe 274 which winds downwardly from the top of the applicator head 246 adjacent the wall thereof. The water enters the flash boiler 276 part of the steam generator 272, which is located adjacent to and heated by the flame from the burner head 262. Here the water is converted to steam and the pressure of expansion forces it down a short exit pipe 278 to exit out of the applicator tube 246 with additional heat from the flame. This heat and steam is applied to the target area to control the unwanted vegetation.

The steam generator 272 of this embodiment is a coil of suitable metal tubing such as copper, stainless steel or a suitable metal alloy. The coils are tight together in the pre heater near the top in the region of the burner head 262 and spaced slightly apart at the flash boiler 276 lower end. This allows for preheating of the water within the tight coils and efficient heat transfer to the spaced coils while allowing the excess heat and expanding gases to pass though through the gaps between the coils at the lower end and mix with the escaping steam. In order to further focus the output of the applicator head 246, the steam generator coils and in some embodiments, the applicator head 246 as well, taper inwardly to surround the flame and focus the output. A preferred such steam generator has tightly wound coils at the top about 2.5 to 5 inches and coils spaced apart about 0.25 inches in the lower 1 to 3 inches. If desired, a pressure relief valve or restrictive nozzle may be provided at the outlet of the steam generator to allow the pressure and temperature of the steam to build up before being released to the target area.

A heat ballast to increase surface area exposed to the flame may be added to assist in retaining and transferring heat to the coils. Baffles may also be added in the air space in the center of the tubing to distribute the flame and modify and help in heat absorption by the steam generator.

In continuous use an apparatus as described above will consume approximately 2 to 6 liters (0.75 to 1.6 U.S. Gallons) of water and 450 to 900 grams (1 to 2 lbs) of fuel per hour. Thus, a backpack or apparatus with about 8 liters (2 gallons) water capacity and about 2 kgs (4.5 lbs.) of fuel would weigh approximately 14 kgs. (30 lbs.) when filled, and would permit approximately 2 hours of operation under normal field conditions of selective application or "spot spraying" of vegetation.

A further embodiment of a steam generator for use in the apparatus of the present invention is illustrated in FIG. 7. The tubing of the steam generator extends downwardly along the exterior of the applicator head 310 to a pre-heating coil 320 within the applicator head 310. The pre-heating assembly is a coiled pipe 320 which winds upwards from the bottom of the applicator head 310 adjacent the wall 312 thereof. The water then enters the flash boiler 322, which is located adjacent to and heated by the flame from the burner head 330. The flash boiler 322 is a cone shaped series of coils having gaps between the coils to allow the flame from the burner to pass through the gaps and surround the coils. Here the water is converted to steam and the pressure of expansion forces it down a short exit pipe 324 to exit out of the applicator head 310 with additional heat from the flame. This hot air and steam is applied to the target area to control the unwanted vegetation.

A further embodiment of an apparatus of the present invention is illustrated in FIG. 8. This embodiment is particularly useful for small scale applications such as would be encountered by a homeowner who was maintaining their own property. The apparatus consists of an applicator wand 400 having a water container 402 for holding the water supply and a fitting for attaching a one pound disposable propane cylinder 404 carrying the fuel supply. The apparatus may be provided with a strap 406 by which the weight of the apparatus may be supported by the user. The water container 402 is capable of holding sufficient water for operation of the apparatus, generally on the order of 1 to 2 liters and is provided with a filler opening 408 and an outlet tubing provided with an inline filter for removing any debris or particulate matter which may accumulate in the water container and which could affect the operation of the downstream valves which will be described below. The water supply may be fed to the steam generator by gravity, however, it is preferred is a small electrically powered pump is utilized to regulate the flow of the water to the steam generator. The pump is switched on by activation of the trigger described below.

The applicator wand 400 of this embodiment is designed for two hand operation and consists of a handle 410, a grip 412 with trigger controls 414, and a suitable dimensioned metal tube or pipe 415 carrying the fuel 416 and water 418 lines and connected to the applicator head 420 containing the burner assembly 422 and steam generator. The applicator head 420 preferably has an insulated, reflective, metallic wall to maximize and focus heat production. The applicator head 420 is dimensioned to produce the desired steam and heat output while being able to be manipulated by the user. Preferably, the applicator head 420 is tubular having an inner diameter of between about 1 and 3 inches, more preferably about 1.5 inches, and a length of between about 4 and 8 inches, more preferably about 6 inches, depending upon burner size and desired steam and hot air output.

A valve controlled by a trigger control 414 regulates the fuel flow to allow for fuel shut off and set the maximum fuel flow. The valve may be a valve having two positions—a "STAND BY" position, which permits a reduced fuel flow to maintain a pilot light in the burner and to provide low heat output, and an ON position when the trigger control is activated which permits full fuel flow and maximum heat. With this type of valve, a control is provided to regulate the flow of fuel in the "STAND BY" position to set the pilot light. Alternatively, the control valve may be a simple ON-OFF valve and the apparatus may include an automatic ignition to light the burner when the fuel is turned on.

The water hose 418 contains a second valve controlled by the trigger control. The second valve may be an on-off valve such that water flow will not commence without the trigger control being activated. The trigger control stops water flow in the "STAND-BY" position, and permits water flow in the "ON" position. Alternatively, the apparatus may provide for a reduced water flow when in the "STAND-BY" mode as will be described in detail below. From the second valve, the water travels down a water tube 428 along the applicator wand pipe to a water metering valve 430 used to set the flow rate of the water flowing to the steam generator. Preferably, the water metering valve 430 is a preset orifice valve having a opening sized to set the desired flow rate, although other types of valves such as an adjustable needle valve may also be used to provide the desired flow rate of the water. Preferably a filter or mesh is provided immediately before the water metering valve 430 to reduce the likelihood of the valve becoming clogged. The water metering valve 430 is located just before a steam generator within the applicator head 420 and a one way valve may also be provided just before the steam generator to reduce back pressure during operation of the apparatus. Similar to the previous embodiments, in the embodiment illustrated, the tubing of the steam generator extends downwardly along the exterior of the applicator head to a pre-heating coil within the applicator head. The pre-heating assembly is a coiled pipe which winds upwards from the bottom of the applicator head adjacent the wall thereof. The water then enters the flash boiler, which is located adjacent to and heated by the flame from the burner head. The flash boiler is a cone shaped series of coils having gaps between the coils to allow the flame from the burner to pass through the gaps and surround the coils. Here the water is converted to steam and the pressure of expansion forces it down a short exit pipe to exit out of the applicator head with additional heat from the flame. This hot air and steam is applied to the target area to control the unwanted vegetation.

In many of the applications it is desirable to provide for a continuous flow of water to the flash boiler, even in STAND-BY mode. By providing a small trickle of water to the flash boiler, the response time when the switch is pressed to the ON position is reduced and the life of the flash boiler is extended. The continuous small flow of water is provided by a suitable means to feed a small amount of water to the flash boiler at all times. The means may be a variable valve having a low flow rate when the switch is in the STAND-BY position and the full flow rate when in the ON position. Alternatively, the means may be provide by a flow bypass which bypasses the main water valve and provides for a low flow of water at all times. Such an arrangement is shown in FIG. 9 where a by pass line 450 is provided between the inlet line 452 and outlet line 454 of the main water valve 456. The bypass line 450 is provided with a restricted orifice 458 to allow for a low flow of water to bypass the valve 456 at all times. When the valve 456 is opened to the ON position, the full flow of water through the valve 456 is provided to the flash boiler.

FIG. 9 also illustrates a further feature of a preferred embodiment of the apparatus of the present invention. In some applications, it is desirable that a higher proportion of hot water be applied, while in other applications, a higher proportion of steam is desired. The proportion of steam to water in the output of the apparatus of the present invention can be adjusted by the amount of water being provided to the flash boiler. The higher the amount of water provided to the flash boiler, the less steam generated as the flow of the water does not allow for sufficient time in the flash boiler for all of the water to be converted to steam. Thus by adjusting the flow rate of the water to the flash boiler, the relative amounts of steam and hot water in the output of the apparatus can be regulated.

There are a number of ways in which the flow of water to the flash boiler and hence the ratio of water and steam in the output can be adjusted. This can be accomplished by providing a flow control valve 460 with a variable adjustment to allow for complete control over the flow of water. In this way, the operator can select the flow rate to provide the optimum ratio for a particular application. However, this also requires to operator to be familiar with the needs for each application and requires some adjustment of the output by the operator.

Figure 9A:
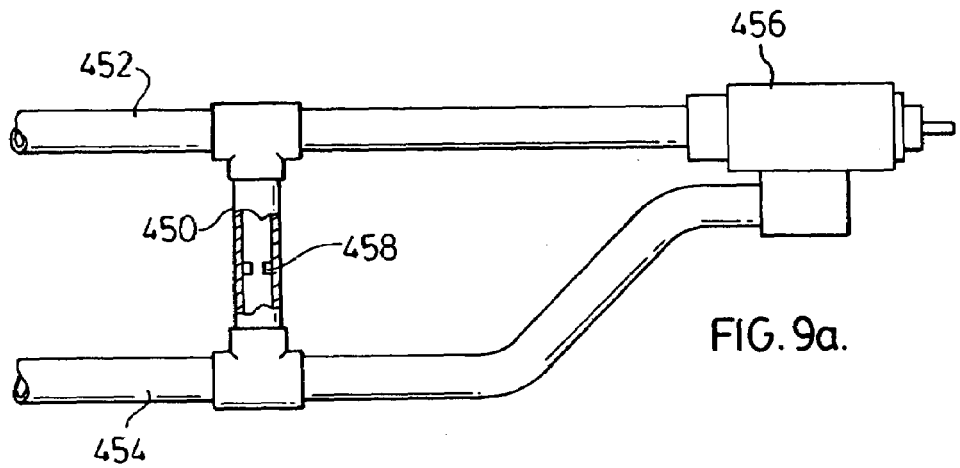
FIG. 9 is a schematic view of a variable water supply means.
Figure 9B:
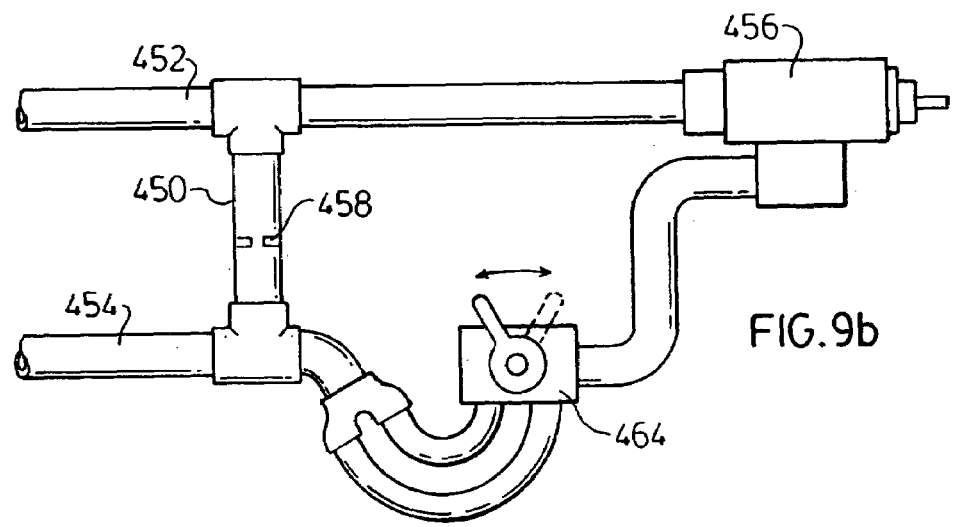

For most applications, the actual ratio of steam to hot water may not be critical, rather the presence of a certain amount of hot water in the output may be advantageous. It is therefore preferred if a multi-position switching means is provided to allow the operator to select a high water, high steam and perhaps intermediate positions. For example, as shown in FIG. 9b, a two position valve 464 having outputs with different sized orifices to control the relative flow of water to the flash boiler may be provided. A selector switch 464 with a water selection 466 and a steam selection 468 is provided to allow the operator to easily switch between the two settings. A three or more position valve may also be used to allow for more options in terms of the ratio of water and steam in the output.

Figure 9C:
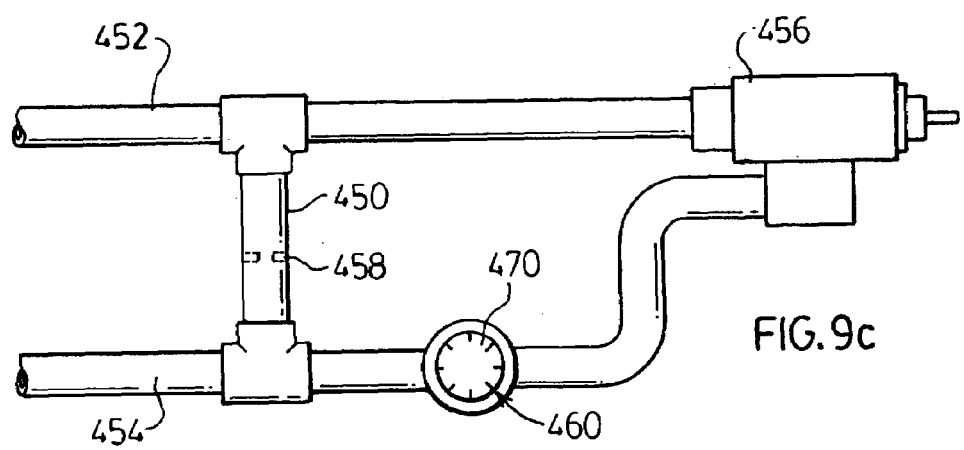

An alternative arrangement is shown in FIG. 9c. In this arrangement, a flow control valve 460, preferably a needle valve, is provided. The valve is calibrated for the desired output settings and the control knob 470 of the valve 460 is provided with markings to allow the user to easily select the desired setting. Thus the valve 460 is calibrated for a high steam output and the control knob position for this setting is indicated. Similarly, a high water setting is determined and the control knob position indicated. One or more intermediate positions between these two settings may be also provided if desired.

Figure 10:
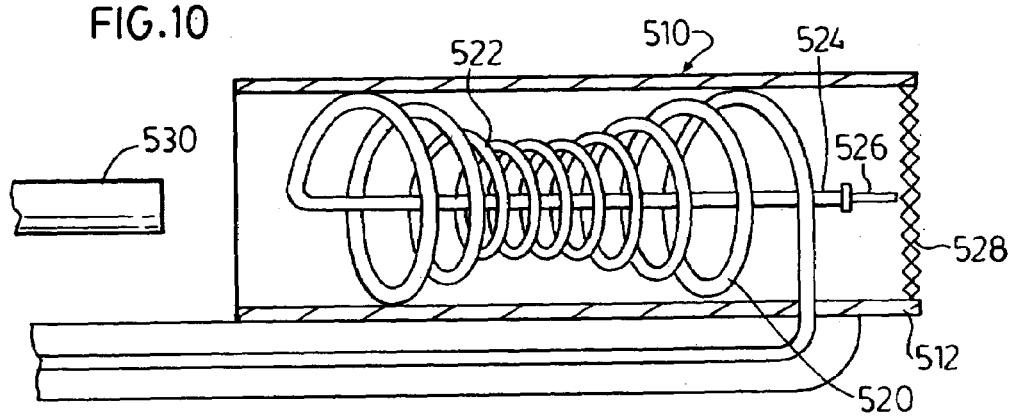
FIG. 10 is a side elevation view in cross section of a further embodiment of a flash boiler for use in the apparatus of the present invention.

A further embodiment of a steam generator for use in the apparatus of the present invention is illustrated in FIG. 10. The steam generator of this embodiment has a generally hour glass shape. The tubing of the steam generator extends downwardly along the exterior of the applicator head 510 to a pre-heating coil 520 within the applicator head 510. The pre-heating assembly is a series of coils which wind upwards from the bottom of the applicator head 520 adjacent the wall 512 thereof. The coils then reduce in diameter and then gradually increase to provide a cone shape to the flash boiler section of the steam generator. The pre-heated water enters the flash boiler section 522, which is located adjacent to and heated by the flame from the burner head 530. The flash boiler 522 being a cone shaped series of coils having gaps between the coils allows the flame from the burner to pass through the gaps and surround the coils. Here the water is converted to steam and the pressure of expansion forces it down a exit pipe 524 to exit out of the nozzle 526 of the applicator head 510 with additional heat from the flame. This hot air and steam is applied to the target area to control the unwanted vegetation.

The embodiment of the applicator head illustrated in FIG. 10 is provided with a screen 528 at the outlet of the applicator head. The screen is preferably a wide mess screen having openings on the order of ½ inch or less, preferably about ¼ inch. The screen 528 helps to restrict the flame from the burner and maintains the flame from the burner within the applicator head. The screen 528 also creates some turbulence in the output of the apparatus to help in the distribution of the hot air, steam and hot water from the apparatus onto the target area.

In some applications, particularly when treating the roots of plants, it is desirable to place the output of the apparatus in close contact with the plant material, and in some situations, it is most desirable if the output is injected directly into the root mass. This can be accomplished by providing an attachment 550 for the end of the flash boiler 552 as illustrated in FIG. 11. The end of the flash boiler output tube 554 is provided with a fitting 556 to which an extension tube 550 may be attached. The fitting 556 is preferably a quick connect fitting or a screw fitting, most preferably a screw fitting. The extension tube 550 is provided with a fitting 558 complementary to the fitting 556 on the end of the output tube 554 of the flash boiler 552 such that it may easily be attached and detached from the output tube 554 as desired. Preferably, the extension tube 550 has a restrictive profile 560 to increase the force with which the treatment mixture of steam and/or hot water from the flash boiler is dispensed to increase the penetration of the treatment mixture into the root structure of the plant. As illustrated in FIG. 11, the restrictive profile 560 is preferably provided by flattening the tube 550 to reduce the output diameter of the extension tube.

Figure 12:
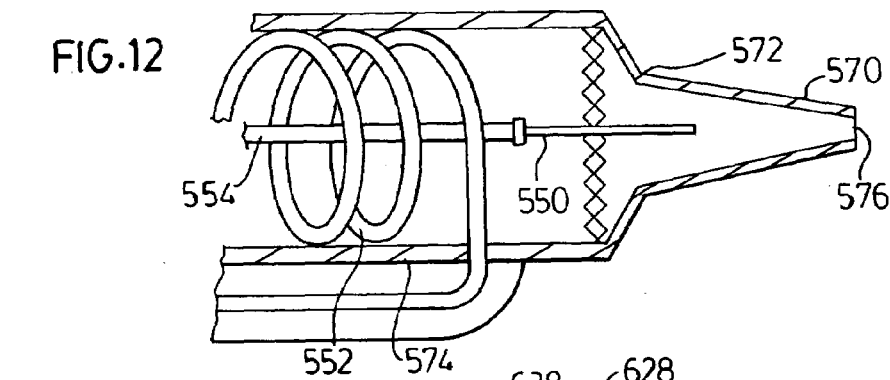
FIG. 12 is a perspective view of a further attachment for the flash boiler of the present invention.

In other applications, it may be desirable to be able to push the output either deeper into the plant or to increase the contact pressure between the output and the plant material. In order to accomplish this it is desirable that the extension of the flash boiler output be capable of withstanding these forces. A simple extension tube 550 such as shown in FIG. 11 may bend under such forces and be less effective. In these situations, a further attachment 570 is provided to allow the extension tube 550 to be placed where desired with the necessary force. The additional attachment 570 surrounds the extension tube 550 and prevents it from being damaged and rendered less effective when forced into the plant material or surrounding soil. As illustrated in FIG. 12, preferably the attachment 570 has a funnel shape with the top 572 of the funnel supported by the applicator head 574 and the point 576 of the funnel containing and protecting the extension tube 550. The funnel shape also acts as a wedge as the attachment is forced into the plant material or soil, allowing for greater penetration for treatment.

Figure 14:
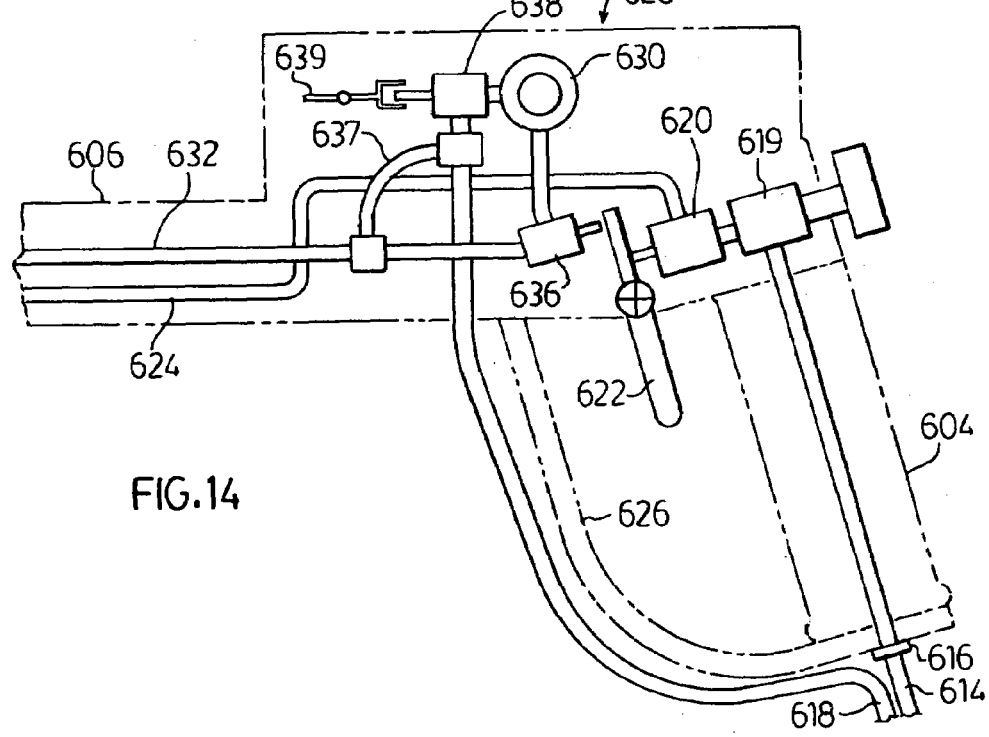
FIG. 14 is a side elevation view partly in cross section of the valve and handle assembly of the embodiment of FIG. 13.

A further embodiment an applicator wand for use with the apparatus of the present invention is illustrated in FIGS. 13 and 14, generally indicated by the numeral 600. The applicator wand 600 of this embodiment is designed for two hand operation and consists of a handle 602, a pistol style grip 604 with trigger controls, and a suitable dimensioned metal tube or pipe 606 carrying the fuel and water lines and connected to the applicator head 608 containing the burner assembly 609 and steam generator 610. The applicator head 608 preferably has an insulated, reflective, metallic wall 612 to maximize and focus heat production. The applicator head 608 is dimensioned to produce the desired steam and heat output while being able to be manipulated by the user. Preferably, the applicator head 608 is tubular having an inner diameter of between about 2 and 6 inches, more preferably about 3 inches, and a length of between about 8 and 20 inches, more preferably about 10 inches, depending upon burner size and desired steam and hot air output.

Referring to FIG. 14, the fuel line 614 is connected to the pistol grip 604 of the applicator wand 600 through a suitable connection such as a quick connect fuel fitting 616. Preferably, for ease of handling, the fuel line 614 and water line 618 are joined together along most or all of their length. A control valve 619 located in the pistol grip 604 downstream from the fuel fitting 616 regulates the fuel flow to allow for fuel shut off and set the maximum fuel flow. A second control valve 620 is provided downstream of the first control valve 619 and has two positions—"STAND BY" position, which permits a reduced fuel flow to maintain a pilot light in the burner as will be explained below and to provide low heat output, and an "ON" position when the trigger control 622 is activated which permits full fuel flow and maximum heat. The "STAND BY" position of the valve is adjustable to set the flame for the "STAND BY" or pilot flame such as through the use of a suitable needle valve. From the control valve 620, a fuel line 624 then travels along the pipe 606 of the applicator wand 600 to the burner assembly 609 located at the inlet of the applicator head 608.

The water line 618 is connected to the hand guard 626 of the pistol grip 604 of the applicator wand 600, and then enters a water valve assembly 628. The water valve assembly 628 contains a water metering valve 630 used to set the flow rate of the water flowing through the water line 632 exiting the valve assembly 628 and extending along the pipe 606 to the steam generator 610 within the applicator head 608. Preferably, the water metering valve 630 is a needle valve, although other types of valves such as a preset orifice valve may also be used to provide the desired maximum flow rate of the water. From the water metering valve 630, a water line 634 is attached to a second valve 636 controlled by the trigger control 622. The second valve 636 is an on-off valve such that water flow will not commence without the trigger control 622 being activated. The second valve 636 stops water flow in the "STAND-BY" position, and permits water flow in the "ON" position. The water valve assembly also provides for a reduced water flow when in the "STAND-BY" mode. A flow bypass bypasses the valves 630 and 636 and provides for a low flow of water at all times is provided. Such an arrangement is as shown in FIG. 9a where a by pass line 637 is provided between the inlet line 618 and outlet line 632 of the water supply. The bypass line 637 is provided with a restricted orifice to allow for a low flow of water to bypass the valves 630 and 636 at all times. When the second valve 636 is opened to the ON position, the full flow of water through the valve 636 is provided to the steam generator 610.

In addition, the water valve assembly 628 is provided with an arrangement to allow for changing the ratio of water to steam, preferably a two position valve 638 having outputs with different sized orifices to provide a high water or high steam output of the flash boiler in a manner as described above in FIG. 9b. A selector switch 639 with a water selection and a steam selection is provided to allow the operator to easily switch between the two settings.

From the second valve 636, the water travels down a water line 632 along the applicator pipe 606 to the steam generator 610 within the applicator head 608. The steam generator 610 has a pre-heating assembly which is a counter current coil 640 which winds upwards from the bottom of the applicator head 608 adjacent the wall 612 thereof. The water then enters the flash boiler steam chamber 644, which is located adjacent to and heated by the flame from the burner assembly 609. Here the water is converted to steam and the pressure of expansion forces it down a exit pipe 642. The applicator head 608 is provided with a wide mess screen 644 at the outlet of the applicator head which helps to restrict the flame from the burner and maintain the flame from the burner within the applicator head 608. The screen also creates some turbulence in the output of the apparatus to help in the distribution of the hot air, steam and hot water from the apparatus onto the target area.

Figure 15:
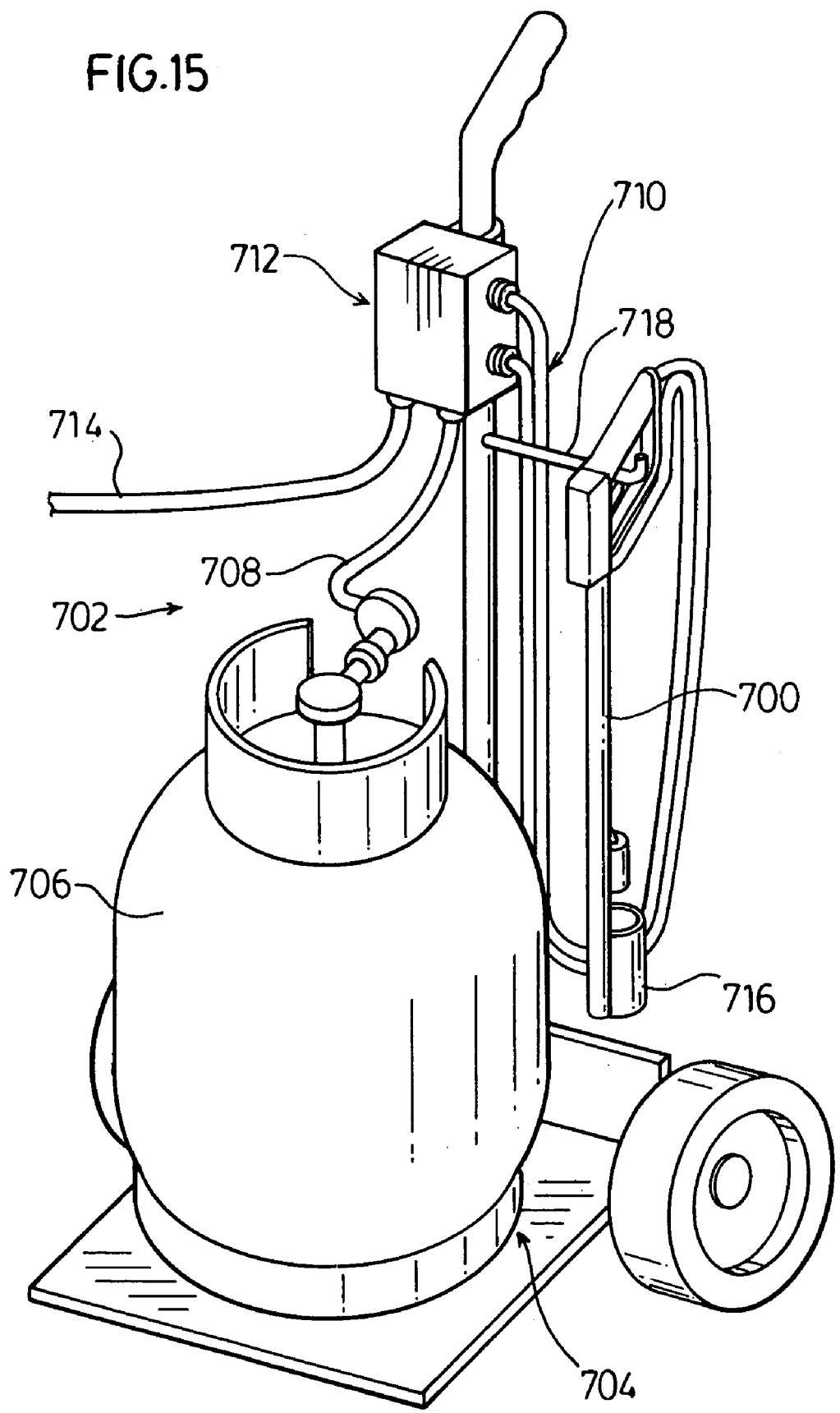
FIG. 15 is a perspective view of a further embodiment of the apparatus of the present invention.

A further embodiment of the apparatus of the present invention, particularly for use by a homeowner is illustrated in FIG. 15. The apparatus utilizes an applicator wand 700 as described with respect to FIGS. 13 and 14 above and a cart arrangement 702 to supply the fuel and water to the applicator wand 700. The cart 702 is provided with a holder 704 for a fuel container, preferably a propane cylinder 706 which connects to the applicator wand 700 through a suitable fuel hose 708. The cart 702 is also provided with a water hose 710 connected at one end to the applicator wand 700 and having a pressure reducing valve 712 on the other end. A garden hose 714 is then connected between the pressure reducing valve 712 and the domestic water supply of the house, typically by attaching the garden hose 714 to an exterior hose bib. As the unit is designed for homeowner use, where a constant supply of water is available, a separate water container and pump are not required. The pressure of the water from the domestic water supply provides for a sufficient flow of water for operation of the apparatus. The cart 702 is also provided with a holder 716 to hold the applicator wand 700 and a holder 718 to allow the fuel hose 708 and water hose 710 to be coiled for storage and transport.

To operate the apparatus of the present invention, the user first fills the water container and ensures that there is an adequate supply of fuel. The outlets of the water container and fuel supply are connected to the inlet of the applicator wand with the water and fuel hoses. The fuel flow valve is turned to set the appropriate fuel flow rate with the trigger switch in the "STAND-BY" position. The burner head is then lit and with the trigger switch in the "ON" position, the fuel flow valve and water flow valves adjusted to provide optimum water and fuel flow. During this set up operation, the burner is heating both the pre-heater and steam generator and the trigger switch is held in the on position until steam is observed coming from the applicator head. At this point the user releases the trigger switch to shut off or reduce the flow of water and allow the low "STAND-BY" flow of fuel to the burner head to maintain a low flame which also prevents the temperature of the water pre-heater and steam generator from dropping rapidly.

The user then moves along the area to be treated and the applicator head is placed over the target area containing pests such as unwanted vegetation and the trigger switch activated to start the flow of water and fuel. The outlet end of the applicator head is held as close as possible to the target area for a few seconds. The trigger switch is then released and the user moves to the next target area where the process is repeated. With the backpack version of the apparatus of the present invention having the hand pump, the user operates the hand pump intermittently to maintain the water flow.

The smaller backpack apparatus is intended for small scale application such as "spot spraying" or selective control of weeds among desired vegetation, such as control of weeds growing in shrub or vegetable gardens, lawns and cracks or crevices in pavement. The larger vehicle mounted apparatus, with increased fuel and water capacity and greater steam and heat output is intended for large scale applications such as vegetation control along roadsides, ditches, fence lines or vacant areas.

For reasons of safety, heat and steam output could be controlled through automatic water and/or fuel input valves instead of manually controlled needle or orifice flow control valves. A bimetallic (or electric) thermostatically controlled valve for example could automatically monitor output and regulate water and/or fuel supply to the applicator head. A temperature gauge could also be provided to give an indication of the output temperature of the hot air and steam. The temperature sensing device would be located at the outlet of the applicator head and the display of the temperature could be provided at the handle to allow the user to easily observe the output temperature.

To help maintain the temperature of the hot air and steam from the applicator head, a removable funnel shaped shroud may be provided to slip over the outlet end of the applicator head. To provide for increased safety of the operator, a safety shield may be attached to the shaft above the applicator head to protect against possible blowback of hot air and steam.

To provide for adjustability in the length of the applicator wand and to increase user comfort, the metal tube of the applicator wand may be adjustable in length, by providing a telescoping tube having one tube slid able within another and a releasable locking means to lock the tubes in the desired position. Alternatively, the wand may be two tubes located and connected side by side to one another and slidable one past the other to allow for length adjustability. A releasable locking means is provided to lock the tubes in the desired position.

Another modification to increase user comfort could be the provision of a single removable small wheel capable of withstanding the output temperatures of the apparatus attached to the delivery end of the wand applicator. This would allow the user to roll the apparatus along the ground, thus reducing the weight supported the user. This would be of particular use with the larger apparatus or where the apparatus is being used for pest control of cracks and crevices along hard surfaces such as pavement or concrete.

The apparatus of the present invention provides for effective control of pests such as unwanted vegetation in an easy to operate apparatus. The apparatus generates steam on the fly by injecting small quantities of water into a steam generator heated by a burner head located in the applicator head, close to the area of application. The water is injected into the steam generator thus allowing for a simpler to manufacture and operate apparatus. The apparatus operates unlike a boiler based apparatus where the steam is generated in a boiler and then carried to the applicator head. Such a prior art apparatus requires a much more complex design as the steam must be transported from the boiler to the applicator head while not losing a significant amount of its heat. This present apparatus utilizes its generated heat which is applied with the steam for enhanced efficiency instead of venting it away or having to insulate and pipe it to the target area. This apparatus avoids the potentially dangerous use of a boiler and contained high-pressure steam.

In addition to use in controlling vegetation, the apparatus of the present invention can be used to control other pests such as insect infestations, fungal growth, etc. In addition the apparatus can also be used to clean surfaces which are not susceptible to damage by higher temperatures. For example, the apparatus can be used to remove mollusks or mussels from ship hulls, particularly metal hulled vessels or grease and oil from oil rigs. The apparatus can also be used for cleaning of other surfaces such as concrete, brick, etc. It is particularly useful for removal of paint, especially graffiti and gum from such surfaces or for de-icing and drying. The apparatus is also useful for asphalt repair and softening roofing tar. Another possible use of the apparatus of the present invention is for heat activation of other materials such as detergents or cleansers. In all of these applications, the output of the applicator head is adjusted through adjustment of fuel and water supply to maximize effectiveness.

Although various preferred embodiments of the present invention have been described herein in detail, it will be appreciated by those skilled in the art that variations may be made thereto without departing from the spirit of the invention or scope of the appended claims.

I claim:

1. An apparatus for directing at least one of steam, hot water and hot water vapor along with air heated by a burner onto a target area, the apparatus comprising a water container and a fuel container connected and supplying water and fuel to a boiler and the burner within an applicator head attached to a holding means, the applicator head comprising an inlet, an outlet, and a body therebetween, the boiler and burner being located adjacent the outlet and generating a blast of at least one of steam, hot water and hot water vapor along with heated air from the burner adjacent to the outlet for application through the outlet to a target area a first control for controlling the flow of water comprising an ON position and an OFF position and a second control for controlling the flow of fuel comprising a STAND BY position in addition to an ON and an OFF position the STAND BY position permitting sufficient flow of fuel to maintain a low flame in the burner, the controls controlling the flow of water and fuel so that the blast of at least one of steam, hot water and hot water vapor along with heated air is only generated as needed.

2. An apparatus according to claim 1 wherein both the first and second controls are controlled by a single switch.

3. An apparatus according to claim 2 wherein the ON position of the switch activates both the first and second controls to the ON position and the OFF position of the switch activates the first control to the OFF position and the second control to the STAND BY position.

4. An apparatus according to claim 3 wherein the applicator head further comprises a preheater to raise the temperature of the water prior to its entry into the steam generator.

5. An apparatus according to claim 4 wherein the preheater comprises a countercurrent metal coil within the applicator head.

6. An apparatus fat producing a blast of heated air and at least one of steam, superheated steam, hot water and hot water vapour for application to a target area, said apparatus comprising:
a holding means:
a flash boiler, said flash boiler coupled to said holding means;
an applicator head, said applicator head coupled to said holding means, said applicator head comprising a housing, an Inlet and an outlet to define a cavity to accept said flash boiler; and
a water container and a fuel container connected and supplying water and fuel to said flash boiler, such that in use, fuel and water are supplied essentially simultaneously to said flash boiler and a blast of heated air and at least one of steam, superheated steam, hot water and hot water vapour is urged from the outlet adjacent a target area.

7. The apparatus of claim 6, wherein said flash boiler is adjacent said outlet.

8. The apparatus of claim 7 wherein said flash boiler further comprises a suitably selected preheating coil for delivery and efficient preheating of water to said flash boiler.

9. The apparatus of claim 8 wherein said flash boiler comprises a countercurrent coil within said applicator head housing.

10. The apparatus of claim 6 further comprising turbulence means, said turbulence means located within said housing.

11. The apparatus of claim 10 wherein said turbulence means are baffles.

12. The apparatus of claim 6, wherein said flash boiler comprises a burner and a steam generator.

13. The apparatus of claim 6 wherein said holding means is a wand, said wand being suitably selected to permit hand operation of said apparatus.

14. An apparatus for generating at least one of steam, hot water and hot water vapor along with air heated by a burner for application to unwanted vegetation, the apparatus comprising:
a wheeled cart supporting a water container, a water pump and a fuel container,
an applicator wand comprising a holding means and an applicator head coupled to the holding means, said applicator head comprising a housing, an inlet and an outlet to define a cavity to accept a flash boiler adjacent the outlet, the flash bailer comprising a steam generator and a burner for heating the steam generator,
a first elongate hose connecting the water container to a first control located on the applicator wand, the first control controlling and supplying a flow of water to the steam generator,
a second elongate hose connecting the fuel container to a second control located on the applicator wand, the second control controlling and supplying a flow of fuel to the burner,
both the first and second controls controlled by a single switch, such that when said switch is activated, fuel and water are supplied essentially simultaneously to said flash boiler and a blast of heated air and at least one of steam, superheated steam, hot water and hot water vapor is urged from the outlet to the unwanted vegetation.

15. The apparatus of claim 14 wherein said first and second controls provide for a high flow when said switch is activated and a low flow when said switch is not activated to provide a pilot light for the burner and a small amount of water to the steam generator.

* * * * *